US012756737B2

(12) United States Patent
Taylor et al.

(10) Patent No.: US 12,756,737 B2
(45) Date of Patent: Oct. 6, 2026

(54) POSITIVE REINFORCEMENT PHISHING IDENTIFICATION SIMULATIONS

(71) Applicant: CyberHoot, LLC, Smyrna, DE (US)

(72) Inventors: Charles Eugene Taylor, Smyrna, DE (US); Bradley Margist, Charlotte, NC (US); Rafael Boquetti, Newark, DE (US); Craig Matthew Taylor, Hampton, NH (US)

(73) Assignee: CyberHoot, LLC, Smyrna, DE (US)

( * ) Notice: Subject to any disclaimer, the term of this patent is extended or adjusted under 35 U.S.C. 154(b) by 59 days.

(21) Appl. No.: 18/960,792

(22) Filed: Nov. 26, 2024

(65) Prior Publication Data

US 2025/0175488 A1 May 29, 2025

Related U.S. Application Data

(60) Provisional application No. 63/603,887, filed on Nov. 29, 2023.

(51) Int. Cl.
*H04L 9/40* (2022.01)

(52) U.S. Cl.
CPC ...... *H04L 63/1433* (2013.01); *H04L 63/1483* (2013.01)

(58) Field of Classification Search
CPC .............................. H04L 63/1433; H04L 9/40
See application file for complete search history.

(56) References Cited

U.S. PATENT DOCUMENTS

2018/0191776 A1* 7/2018 Irimie .................. G06F 40/186
2021/0090463 A1* 3/2021 Atencio .............. H04L 63/1433
2025/0005150 A1* 1/2025 Kumar .................... G06F 21/56
2025/0112953 A1* 4/2025 Uniyal ................. G06T 19/006

* cited by examiner

*Primary Examiner* — Quazi Farooqui
(74) *Attorney, Agent, or Firm* — Lando & Anastasi, LLP

(57) ABSTRACT

A computerized platform for implementing a positive reinforcement-based educational campaign to increase awareness of indications of signs of unsafe e-mails is configured to perform a method utilizing an assignment-based approach to provide an assignment to a user in which the user is presented with a simulated e-mail including one or more indicators the user is instructed to determine as being more likely associated with a social engineering-containing e-mail or a safe e-mail. This method of phish testing simulations eliminates the possibility of false positive metrics tied to a company's cyber resiliency and thus improves the overall accuracy of cyber program measures and reporting designed to prevent the most prevalent and successful cyber-attack methods in use today-social engineering delivered through phishing e-mails.

19 Claims, 19 Drawing Sheets

Welcome to CyberHoot Professional Services' cybersecurity awareness training website. You are here today because CyberHoot Professional Services requires you to complete a phishing test.

This is not a typical phish test. The email you will review contains several indicators that are randomly selected from a database of "malicious/phishing" emails and "good/non-malicious" emails.

Those indicators are:

1) Sender
2) Subject
3) Greeting
4) Spelling, punctuation, and grammar
5) Sense of urgency
6) Link
7) Attachment Your task is to find out which indicators are safe and which aren't, in each test.

If you are unsure what to look for, hover your mouse over the "Help Me" link to get important tips. The goal of this exercise is to learn. Think of it as an open-book test.

You may retake the test until you receive a passing grade, just keep in mind that each test is different as CyberHoot changes the indicators each time.

Have fun, and if you have any questions or comments, please direct them to *admin@domain.com*.

Let's Get Started →

*FIG. 1*

Download Certificate of Completion

Go to My Assignments →

100%
Your Score

80%
Minimum Required Score

Congratulations!

You have successfully passed this phish training with a score of 100%.

| Identifier | Correct Answer | Your Answer | Result |
|---|---|---|---|
| Sender | phish | phish | ✓Correct |
| Subject | safe | safe | ✓Correct |
| Greeting | phish | phish | ✓Correct |
| Spelling | phish | phish | ✓Correct |
| Urgency | safe | safe | ✓Correct |
| Link | phish | phish | ✓Correct |
| Attachment | phish | phish | ✓Correct |

*FIG. 15*

| Name | Email | Manager | Groups | Type | Rank |
|---|---|---|---|---|---|
| John Doe | John.Doe@domain.com | John Smith | Cyberhoot Integration, Default | Azure | 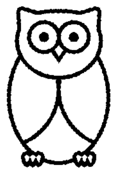 87 |
| Jane Doe | Jane.Doe@domain.com | Bob Smith | Cyberhoot Integration, Default | Azure | 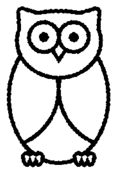 83 |
| Mike Smith | Mike.Smith@domain.com | John Smith | Cyberhoot Integration, Default | Azure |  88 |
| ......... | ........... | ........... | ......... | ......... | .......... |
| ......... | ........... | ........... | ......... | ......... | .......... |
*FIG. 17*

POSITIVE REINFORCEMENT PHISHING IDENTIFICATION SIMULATIONS

CROSS-REFERENCE TO RELATED APPLICATIONS

This application claims priority under 35 U.S.C. § 119(e) to U.S. Provisional Patent Application Ser. No. 63/603,887 titled "POSITIVE REINFORCEMENT PHISHING IDENTIFICATION SIMULATIONS," filed Nov. 29, 2023, the entire content of which is incorporated herein by reference for all purposes.

FIELD OF TECHNOLOGY

Aspects and embodiments disclosed herein are generally directed to an educational platform and method for increasing user's abilities to recognize social engineering delivered through e-mail, for example, to better recognize e-mails that may be phishing attacks.

SUMMARY

In accordance with one aspect, there is provided a computerized platform for implementing an educational campaign to increase awareness of indications of signs of unsafe e-mails. The computerized platform is configured to perform a method comprising utilizing an assignment-based approach to provide one or more assignments to a user in which the user is presented with a simulated e-mail including one or more indicators that the user is instructed to determine as being more likely associated with a social engineering-containing e-mail, often called a phishing email, and thus unsafe, or a non-malicious e-mail, and thus safe.

In some embodiments, the platform is further configured to send an e-mail to a user inviting them to participate in an assignment of the one or more assignments, and responsive to the user accepting the invitation, presenting the assignment to the user in a website dedicated to the educational campaign.

In some embodiments, the platform is further configured to present the user with a window including selectable responses regarding whether an indicator within the simulated e-mail appears safe or unsafe.

In some embodiments, the platform is further configured to mirror hacker attacks with typo-squatted domain names and vendor branding that is not possible for phishing vendors to impersonate and that imitate what real hackers, organized crime, and nation states do when attacking individuals and companies with phishing emails.

In some embodiments, the platform is further configured to present to user with a selectable help link which, if selected by the user, presents the user with information regarding how to determine whether the indicator within the simulated e-mail should be considered safe or unsafe.

In some embodiments, the platform is further configured to present a user with a score and an indication of whether they have passed the assignment substantially immediately responsive to the user having selected whether each of the one or more indicators in the simulate e-mail are safe or unsafe and submitting their selections.

In some embodiments, the platform is further configured to request the user to re-take the assignment if they did not receive a passing score.

In some embodiments, the platform is further configured to randomly select from different content to include within each of the one or more indicators if the user re-takes the assignment.

In some embodiments, the platform is further configured to present the use with positive reinforcement responsive to passing the training assignment.

In some embodiments, the platform is further configured to randomly assign content that should be considered either safe or unsafe to each of the one or more indicators.

In some embodiments, the platform is further configured to assign the user an overall score and a rank responsive performance of the user in the one or more assignments.

In some embodiments, the platform is further configured to present the rank of the user as an avatar, with different avatars being associated with different ranks.

In some embodiments, the one or more indicators include a plurality of indicators selected from the group including sender, subject, greeting, spelling, punctuation, and grammar, urgency and emotionality, links to external websites, and attachments.

In some embodiments, the platform is further configured to automatically adjust difficulty of subsequent assignments taken by the user based on performance of the user in prior assignments.

In some embodiments, the platform is further configured to automatically deliver prompts for performance of assignment-based phishing simulations to e-mail inboxes of users without a need for an administrator to perform email filtration bypass functions including any one or more of: i) direct injection ii) allow-listing, iii) X-Header usage, or iv) PowerShell scripting to deliver the prompts to the inboxes of the users.

In some embodiments, the platform is further configured to provide an indication to an administrator of which users in an organization have completed a phishing assignment or not.

In some embodiments, the platform leads to greater than 90% compliance of all end users having taken and passed the phishing exercise.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 1 illustrates an example of a welcome screen in a website of a platform for educating users how to better identify potentially malware-infected e-mails;

FIG. 15 illustrates an example of a score screen that may be displayed to a user indicating their total score and which identifiers they correctly or incorrectly identified as indicative of a safe or potentially malware-infected e-mail;

FIG. 17 is an example of a dashboard display that an administrator may view to obtain scores of different individuals in an organization for completed assignments as part of the educational program;

DETAILED DESCRIPTION

Figure 2:
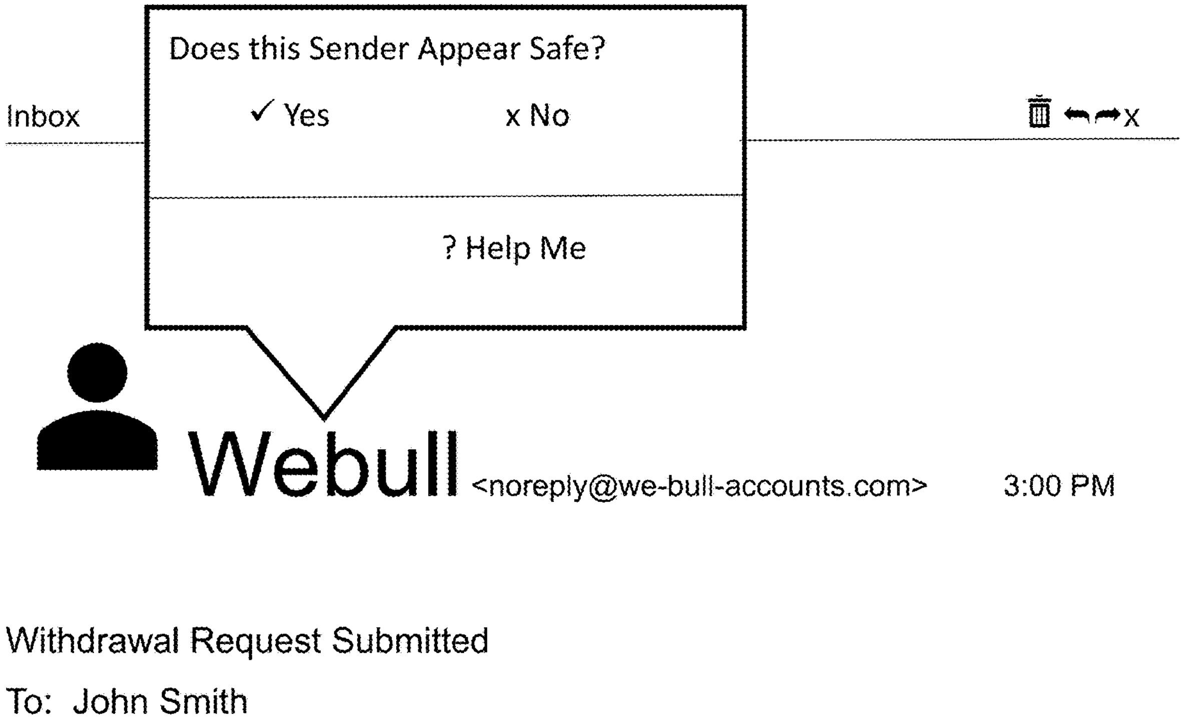
FIG. 2 illustrates an example of a displayed portion of a test asking a user to evaluate if an identifier in a simulated e-mail appears indicative of a safe or potentially malware-infected e-mail.
Figure 3:
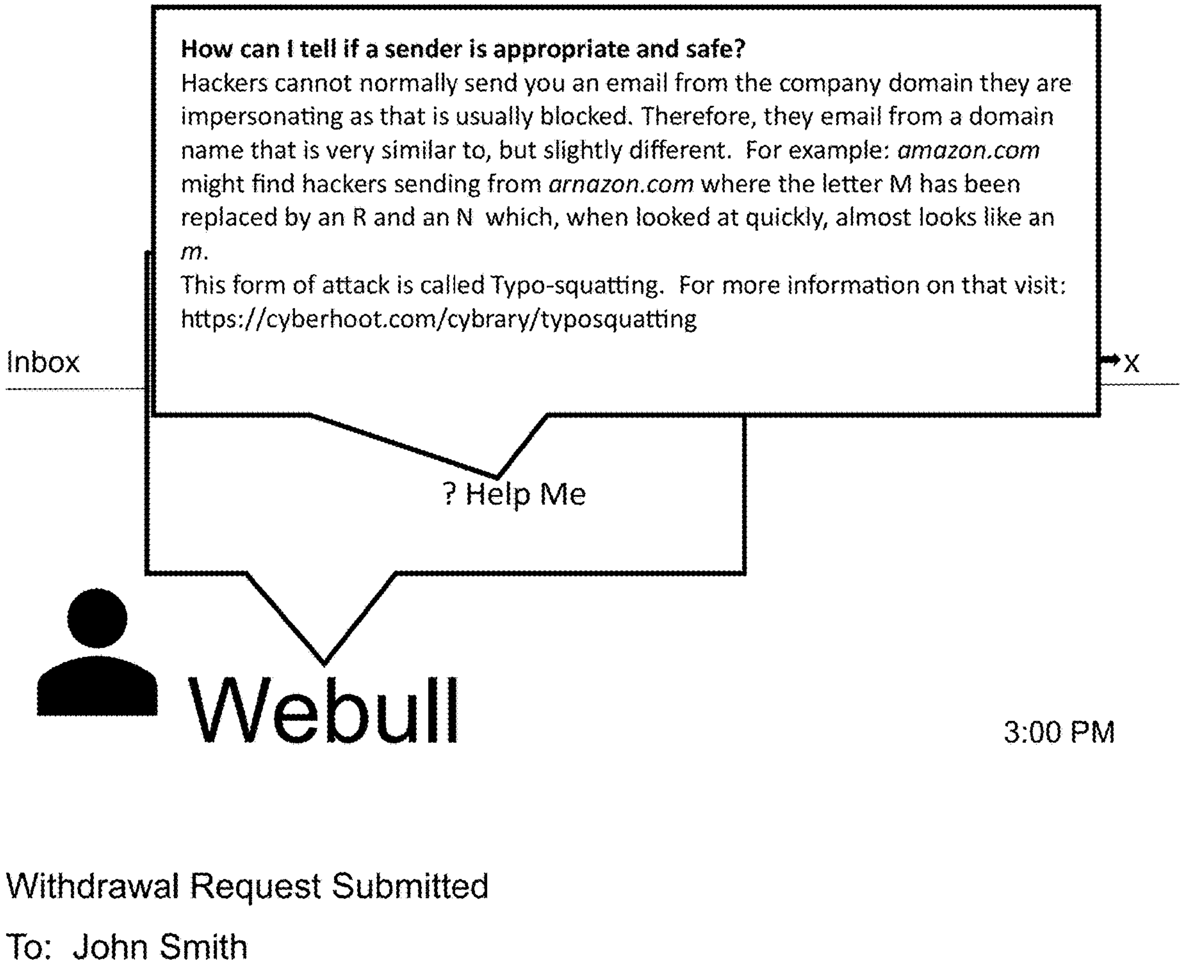
FIG. 3 illustrates an example of a help window that may be displayed to help the user understand how to evaluate the safety of the identifier of FIG. 2.

Malware delivered through e-mail to user's personal or work e-mail accounts is an ever increasing problem. According to certain industry estimates, as of 2023, over 1% of all e-mails sent are malicious, with over 3.4 billion phishing e-mails sent every day. According to Verizon's Data Breach Report, Phishing attacks are involved in 36% of all data breaches. The FBI reports that 83% of all companies experienced phishing attacks in 2021. There can be no doubt that phishing is a scourge online today affecting each and every individual who operates an e-mail address and a computer. Individuals who do not understand how to identify an e-mail as potentially malicious may unknowingly or unintentionally allow a malicious actor to release a ransomware or phishing attack by, for example, clicking on a link in a malicious e-mail or by simply responding to the malicious e-mail. A ransomware attack could subject an individual or their company to a loss of access to valuable data unless a ransom is paid to the actor responsible for the ransomware attack, often with no guarantee that the malicious actor will restore access to the data if the ransom is paid. A phishing attack could allow for the malicious actor to access personal or other confidential data from a user's personal or business computer or network which may be used to perpetrate further fraud such as identity theft, impersonating an individual to apply for credit cards or tax refunds in their name, or to perform other fraudulent or malicious activities.

Information Technology (IT) departments at many, if not most, companies have adopted or are adopting training programs to try and educate employees regarding how to identify potentially malicious e-mails, so they do not inadvertently subject their company to a malware attack. These training programs, however, are often less successful than may be desired.

Some companies' malware education programs may utilize "attack-based phish testing" methods in which an individual from the IT department at the company sends a harmless test e-mail that includes one or more features characteristic of certain forms of social engineering-containing e-mails to employees and checking if employees respond to the e-mail, click on a link in the e-mail, or otherwise act in a manner that could expose the company to vulnerability if the e-mail were genuinely malicious. An employee who took an inappropriate action upon receiving the test e-mail could receive a reprimand or be assigned awareness videos to watch regarding how to spot and avoid phishing attacks or other training tasks. This may be perceived negatively by the employee, degrading their opinion of and relationship with the IT department, and reducing their willingness to comply with further requests to participate in educational programs regarding identifying malicious e-mail.

Attack-based phish testing methods may be less effective at teaching employees to avoid phishing attacks than desirable because they typically only measure what employees already know and fail to teach them new skills. These methods are often difficult and time-consuming to administer and by their nature make it difficult to gather accurate statistics on whether an employee opened an e-mail but did not click on a suspicious link or regarding what indicators of potential malware employees were unable to identify and that they should be further educated about. Further, in many instances, getting attack-phishing e-mails into peoples' inboxes is difficult, time-consuming, and often fails due to changes in the underlying heuristics Microsoft, Google and other e-mail providers use to identify and block such messages. For example, to get attack-phishing e-mails past spam filers and into peoples' inboxes, an IT administrator may have to perform email filtration bypass functions including any one or more of direct injection, allow-listing, X-Header usage, or PowerShell scripting. This leads many IT administrators to give up attempting to perform phish testing, leaving employees without the tools they need to practice the phishing knowledge they obtain through videos and assignment-based phishing simulations. Aspects and embodiments disclosed herein may not require an IT administrator to perform any of these email filtration bypass functions to get a phishing e-mail assignment to a user. The terms "IT administrator" or "administrator" or grammatical variations used herein are intended to refer to individuals in an IT department of an organization and/or a managed service provider (MSP) that may have responsibilities for managing aspects and embodiments of the systems and methods disclosed herein.

Studies have shown that attack-based phish testing methods may have unintended side effects that actually make employees more susceptible to phishing rather than less. (See Lain et al., *Phishing in Organizations: Findings from a Large-Scale and Long-Term Study*.) Further, attack-based phish testing methods may subject a company to receipt of cease-and-desist letters from companies whose names or e-mail domains are spoofed in the test e-mails should an employee, believing the test e-mail to be genuine, reports the test e-mail to one of various online phishing reports websites.

Aspects and embodiments disclosed herein may address at least some of the problems inherent in conventional malicious e-mail detection education programs by replacing attack-based phish testing with "assignment-based" phish testing. As opposed to attack-based phish testing, assignment-based phish testing may teach an individual methods of identifying malicious e-mails that they do not already know rather than only testing what they do know. Aspects and embodiments of the methods disclosed herein may be interactive, may resemble open-book tests, and may provide substantially immediate feedback to a user after providing answers to a test on what to look for in a potentially suspect e-mail, which may be highly beneficial for learning. The term "substantially immediately" as used herein refers to providing an indication of results of an assignment-based phish test directly after a user submits their answers to the test. These results may be provided "substantially" immediately due to lags inherent in information transfer and processing to calculate, send, and display the results to the user.

Aspects and embodiments disclosed herein may reward employees for "passing" a test, which may improve the relationship between employees and their IT departments, rather than harming it.

The disclosed methods may involve tasking a user with examining multiple attack indicators in an e-mail (e.g., sender, subject, greeting, spelling, punctuation, and grammar, urgency and emotionality, links to external websites, and attachments) and may gather reliable statistics not only regarding what employees completed what tests and what employees "passed" what tests, but also what attack indicators employees may have the most difficulty recognizing.

Aspects and embodiments may provide assignments for employees to complete within a dedicated website so that the employees know that they are participating in an educational session and have no reason to report the simulated e-mails they are presented with to a phishing report website.

Aspects and embodiments of the assignment-based phish testing methods disclosed herein may be adaptive and modify the nature or difficulty of the tests within assignments undertaken by an employee based on how they have performed in previous tests and assignments. The methods may provide automated advancement to more difficult phish testing assignments for a user based upon high performance by the user on prior assignments and/or the number of phishing tests passed by the user. More "points" may be awarded to a user for fewer attempts undertaken prior to passing an assignment and for better passing score percentages in assignments. There may be, for example, three levels of phish testing complexity. At an easy level a user may be presented with an assignment including, for example, six attack examples, and one safe entry example, with a help wizard driven throughout the exercise. At a moderate difficulty level, a user may be presented with an assignment including four attack examples, and three safe entry examples, with the help wizard driven throughout the exercise. At a difficult level a user may be presented with an assignment including a random sampling of examples from a database, wherein the user is driven to choose safe/unsafe components of the e-mail on their own. Users who score enough points on the easy level advance to the moderate level, and upon scoring more points advance automatically to the difficult level. In some embodiments, a user may be automatically promoted from easy to moderate once they have completed a specified number of easy training assignments, for example, four easy training assignments. The user may be promoted from moderate to difficult based on having completed a specified number of moderately difficult phish training assignments, for example, four of the moderately difficult phish training assignments. In some embodiments, a system administrator may have the ability to reset a user's phishing assignment difficulty level under user settings. This is available so that an administrator who determines that an employee could use more trainings at a certain difficulty level can manually reset the difficulty level for the employee.

In some embodiments, each user/employee is presented with a random group of indicators of potential malware for the same test. Different users may take the same phish test at the same difficulty level, but have different content within the phishing identifiers (e.g., sender, subject, greeting, spelling, punctuation, and grammar, urgency and emotionality, links to external websites, and attachments) that is considered either safe or unsafe. If a user re-takes a phishing test because they failed a previous attempt, the content and safe vs. unsafe nature of the identifiers may be randomly shuffled so the test is different the next time around.

Aspects and embodiments of the assignment-based phish testing methods disclosed herein may be gamified by providing a user with an avatar whose appearance and "rank" changes based on their performance and that may be compared to the avatars of other users.

Aspects and embodiments of the assignment-based phish testing methods disclosed herein may automatically measure employee pass/fail attempts, create a cybersecurity point score from those attempts, combine that point score with a point score associated with video trainings completed, and then automatically escalate a user to a more difficult level of phish testing assignments after enough points are accumulated by the user.

In some embodiments, when users take phishing tests, their scores are impacted by two things: the actual score for completing the phishing test; and the number of attempts performed by the user to pass the phishing tests. Each time a user has to retake a phishing test, there may be a deduction to the user's point score, for example, a 5 point deduction. These points earned by a user may be calculated to give the user an overall score and rank. In some embodiments, the scores and ranks of all users/employees in an organization/company may be combined to give the organization/company an overall score and rank.

One example of portions of a phish test assignment is illustrated in FIGS. 1-15. When one is given an assignment to complete, they will receive an e-mail with a link to a webpage from which they can access the assignment. The webpage may present the user with an introduction screen explaining that they have a phishing test assignment so that the user knows that this is a training exercise. The introduction screen may include text reminding the user that the object of the assignment is to identify any indicators (e.g., sender, subject, greeting, spelling, punctuation, and grammar, urgency and emotionality, links to external websites, and attachments) in a simulated e-mail that may have features that might be found in a true social engineering-containing e-mail. The introduction screen may further inform the user that there will typically be a "Help Me" link associated with the different indicators that they can hover their mouse over or otherwise select to receive tips on what to look for to determine if an indicator has features that would be expected in a benign e-mail and thus should be considered safe, or if the indicator has features that would be expected in a malicious e-mail and thus should be considered unsafe. An example of an introduction screen is illustrated in FIG. 1. The user may select a "Start" link, e.g., the "Let's Get Started" box in the example introduction screen of FIG. 1 to be presented with a simulated e-mail to analyze.

The simulated e-mail may load and the user may be presented with a popup window including a question regarding whether the sender indicator appears to be safe or legitimate, for example, whether the domain name of the sender's e-mail address appears legitimate. (See FIG. 2.) If one hovers their computer pointer (mouse, touchpad, etc.) over or otherwise selects the displayed "Help Me" link, a popup window may appear that informs the user how they might be able to tell if the sender appears safe. The popup window may include a web link for further information for the user regarding how to tell if the sender appears safe. (See FIG. 3.) The user may then select the "Yes" or "No" button in the popup associated with the sender based on whether they think the sender is legitimate. In the example of FIG. 2, the domain name of the sender's e-mail is not one that would be expected from the "Webull" organization and should be considered unsafe.

Figure 4:
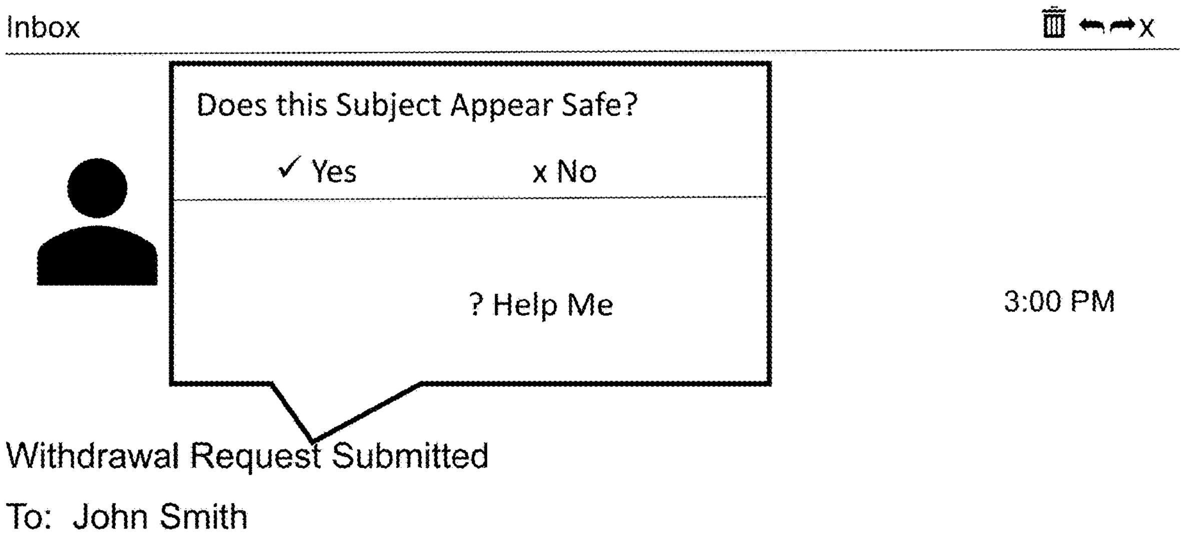
FIG. 4 illustrates an example of a displayed portion of a test asking a user to evaluate if another identifier in a simulated e-mail appears indicative of a safe or potentially malware-infected e-mail.
Figure 5:
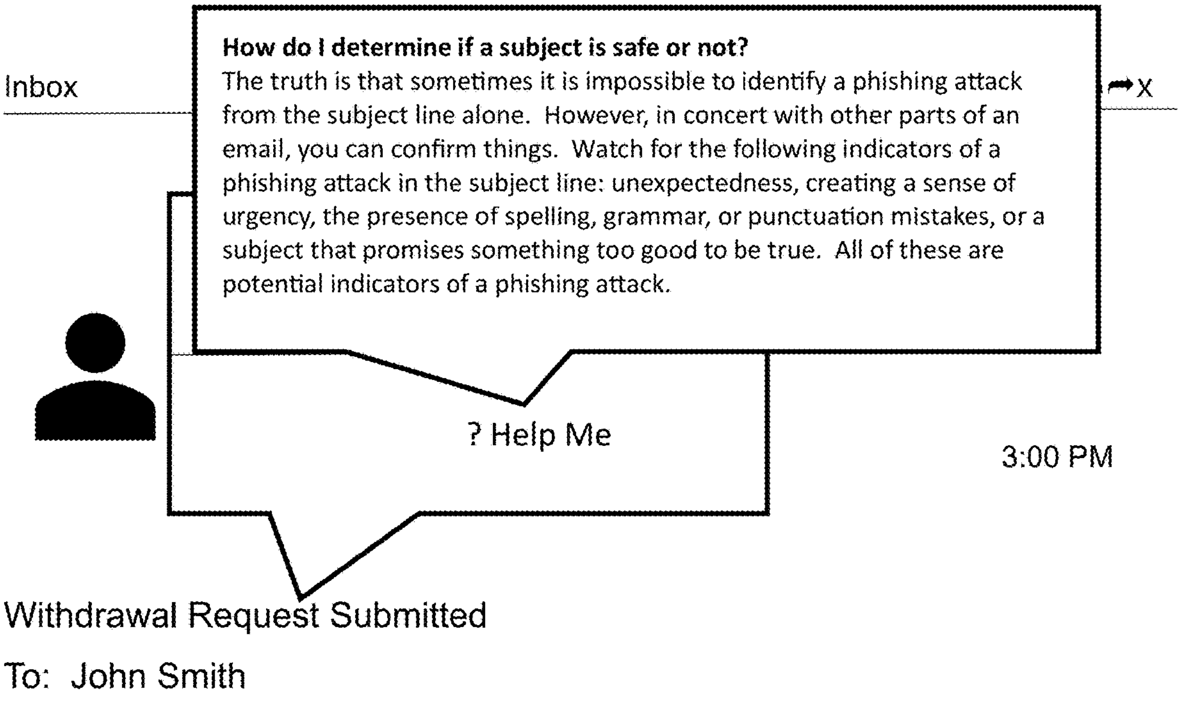
FIG. 5 illustrates an example of a help window that may be displayed to help the user understand how to evaluate the safety of the identifier of FIG. 4.

The assignment next moves on to the next indicator in the e-mail, for example, the subject, and presents another popup window with "Yes" and "No" buttons and another "Help Me" link asking the user to indicate if the subject appears safe, e.g., consistent with a safe e-mail or one that is likely a social engineering phishing e-mail or other form of malware-containing e-mail. (See FIG. 4.) Hovering over or selecting the "Help Me" link brings up a popup window explaining how a user may determine if the subject of the e-mail is safe. (See FIG. 5.) The user may then select the "Yes" or "No" button in the popup associated with the subject based on whether they think the subject seems like a subject that would be included in a safe e-mail or one that would be included in a social engineering-containing or phishing e-mail. In the example of FIG. 4, the subject of the e-mail appears benign and so should be considered safe.

Figure 6:
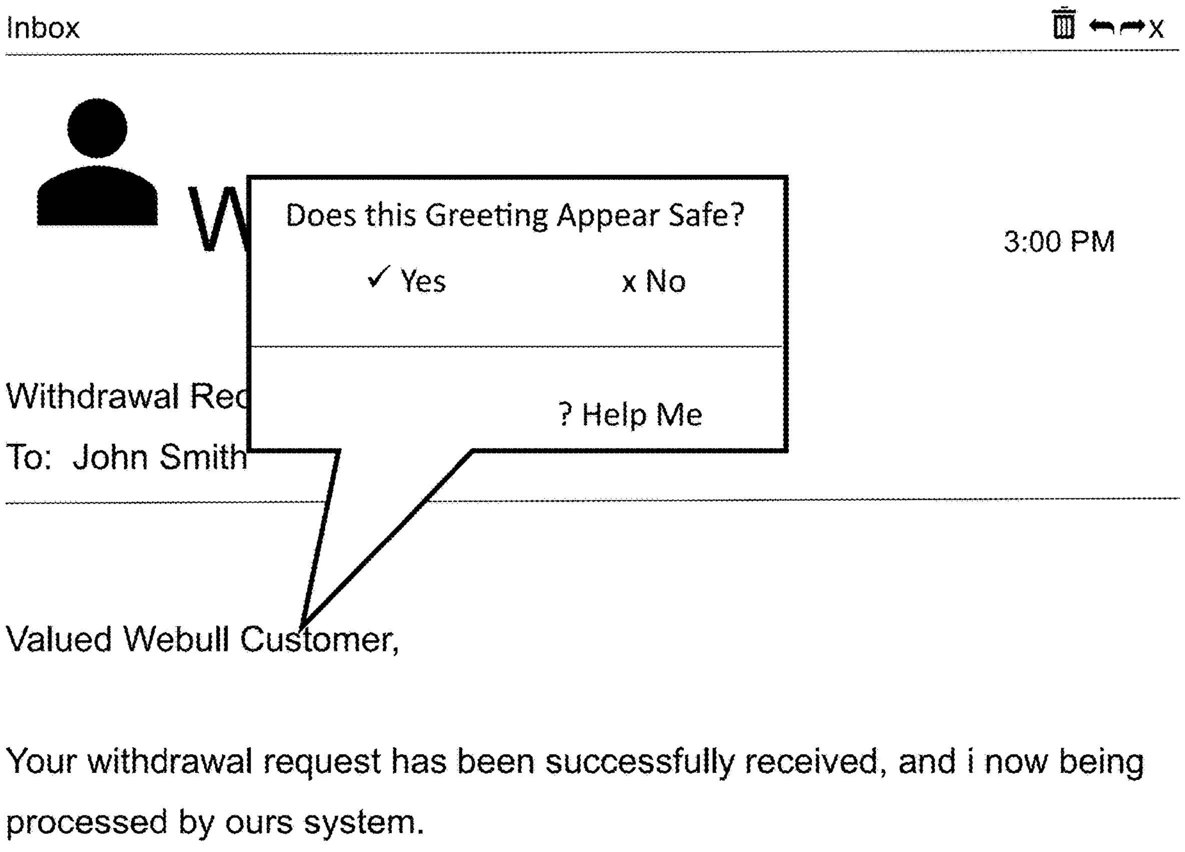
FIG. 6 illustrates an example of a displayed portion of a test asking a user to evaluate if another identifier in a simulated e-mail appears indicative of a safe or potentially malware-infected e-mail.
Figure 7:
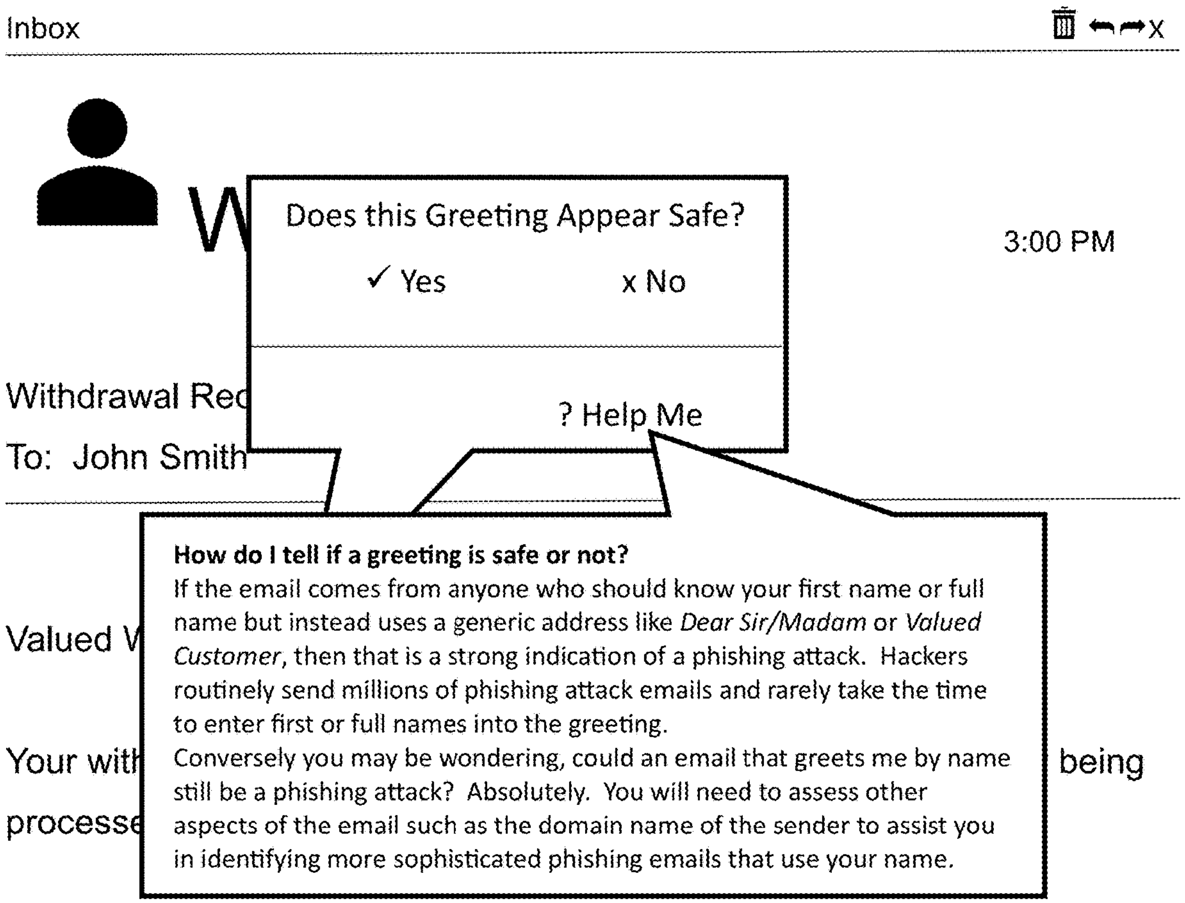
FIG. 7 illustrates an example of a help window that may be displayed to help the user understand how to evaluate the safety of the identifier of FIG. 6.
Figure 8:
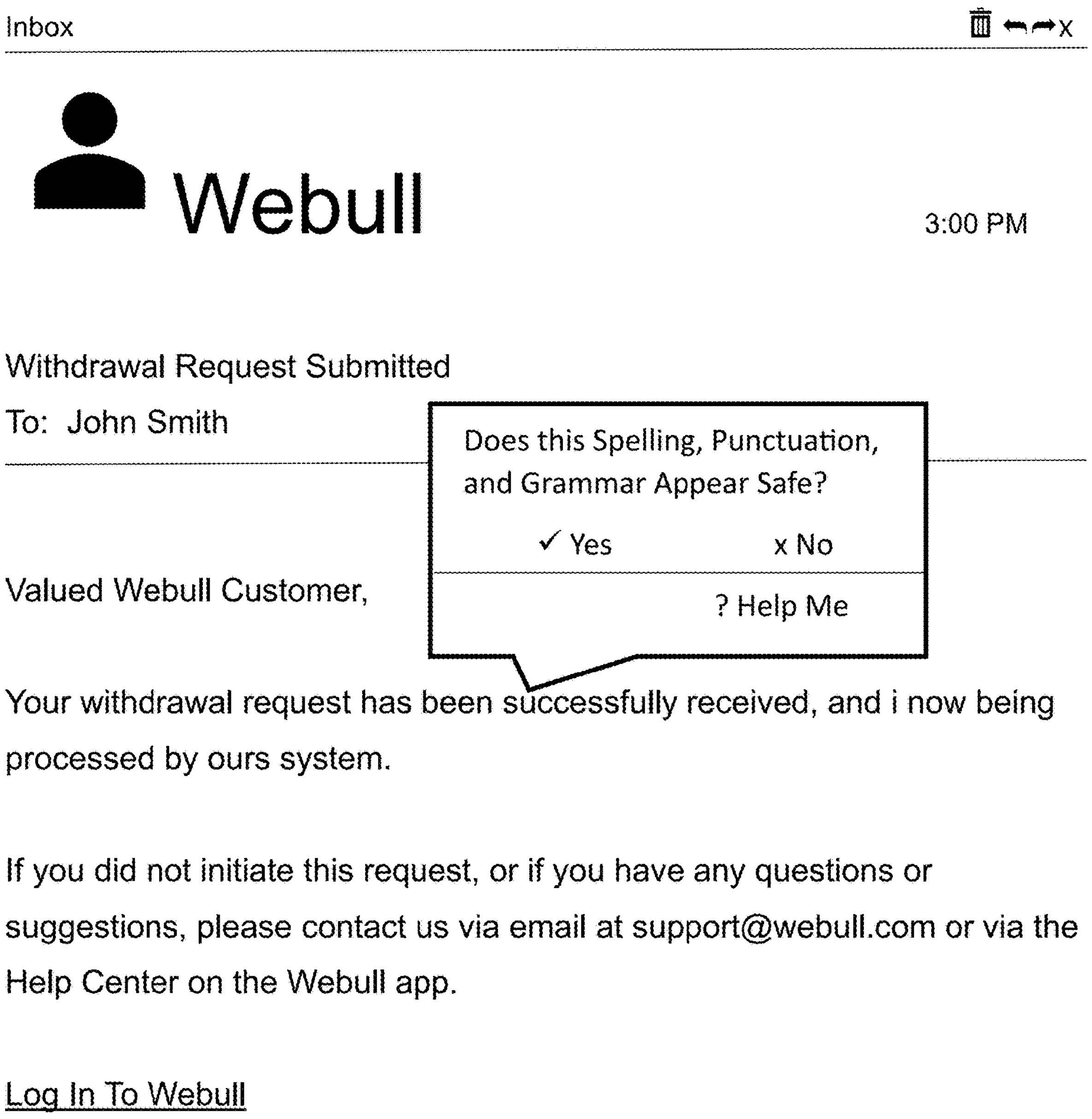
FIG. 8 illustrates an example of a displayed portion of a test asking a user to evaluate if another identifier in a simulated e-mail appears indicative of a safe or potentially malware-infected e-mail.

The assignment next moves on to the next indicator in the e-mail, for example, the greeting, and presents another popup window with "Yes" and "No" buttons and another "Help Me" link asking the user to indicate if the greeting appears safe, e.g., consistent with a safe e-mail or one that is likely a phishing e-mail or other form of social engineering-containing e-mail. (See FIG. 6.) Like for the sender and subject indicators, if one hovers over or otherwise selects the displayed "Help Me" link, a popup window may appear that informs the user how they might be able to tell if the greeting should be considered safe. (See FIG. 7.) The user may then select the "Yes" or "No" button in the popup associated with the greeting based on whether they think the greeting seems like a greeting that would be included in a safe e-mail or one that would be included in a social engineering-containing or phishing e-mail. In the example of FIG. 6, the greeting is generic and not personalized to the user and so should be considered unsafe.

The assignment next moves on to the next indicator in the e-mail, for example, the spelling, punctuation, and grammar of the message text, and presents another popup window with "Yes" and "No" buttons and another "Help Me" link asking the user to indicate if the spelling, punctuation, and grammar appears safe, e.g., consistent with a safe e-mail or one that is likely a phishing e-mail or other form of social engineering-containing e-mail. (See FIG. 8.) Like for the previously described indicators, if one hovers over or otherwise selects the displayed "Help Me" link, a popup window may appear that informs the user how they might be able to tell if the spelling, punctuation, and grammar should be considered safe or unsafe. The user may then select the "Yes" or "No" button in the popup associated with the spelling, punctuation, and grammar based on whether they think the spelling, punctuation, and grammar seems like spelling, punctuation, and grammar that would be included in a safe e-mail or one that would be included in a malware-containing or social engineering phishing e-mail. In the example shown in FIG. 8 there are several spelling and grammar errors in the e-mail message text which may be indicative of the e-mail being unsafe.

Figure 9:
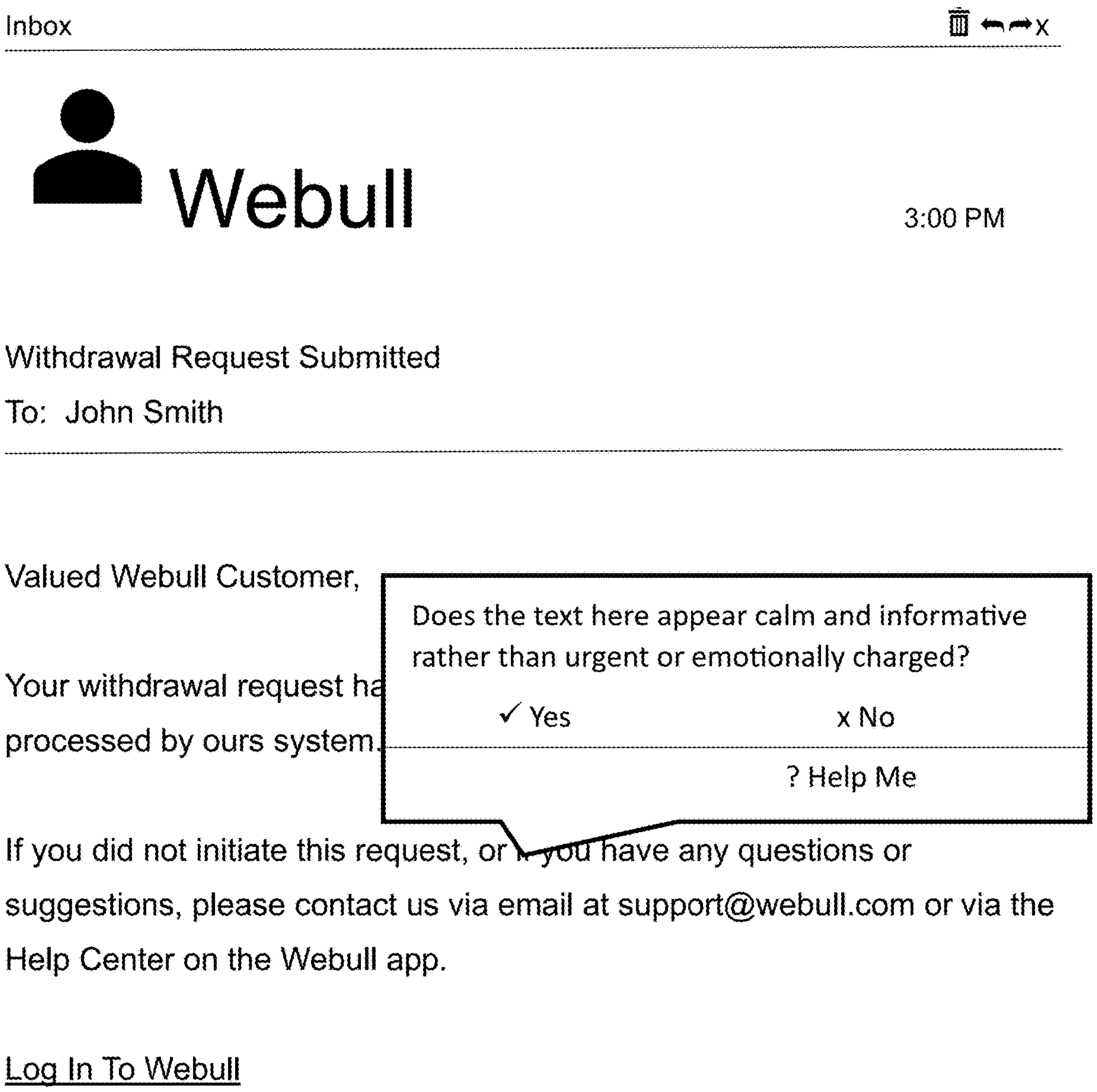
FIG. 9 illustrates an example of a displayed portion of a test asking a user to evaluate if another identifier in a simulated e-mail appears indicative of a safe or potentially malware-infected e-mail.
Figure 10:
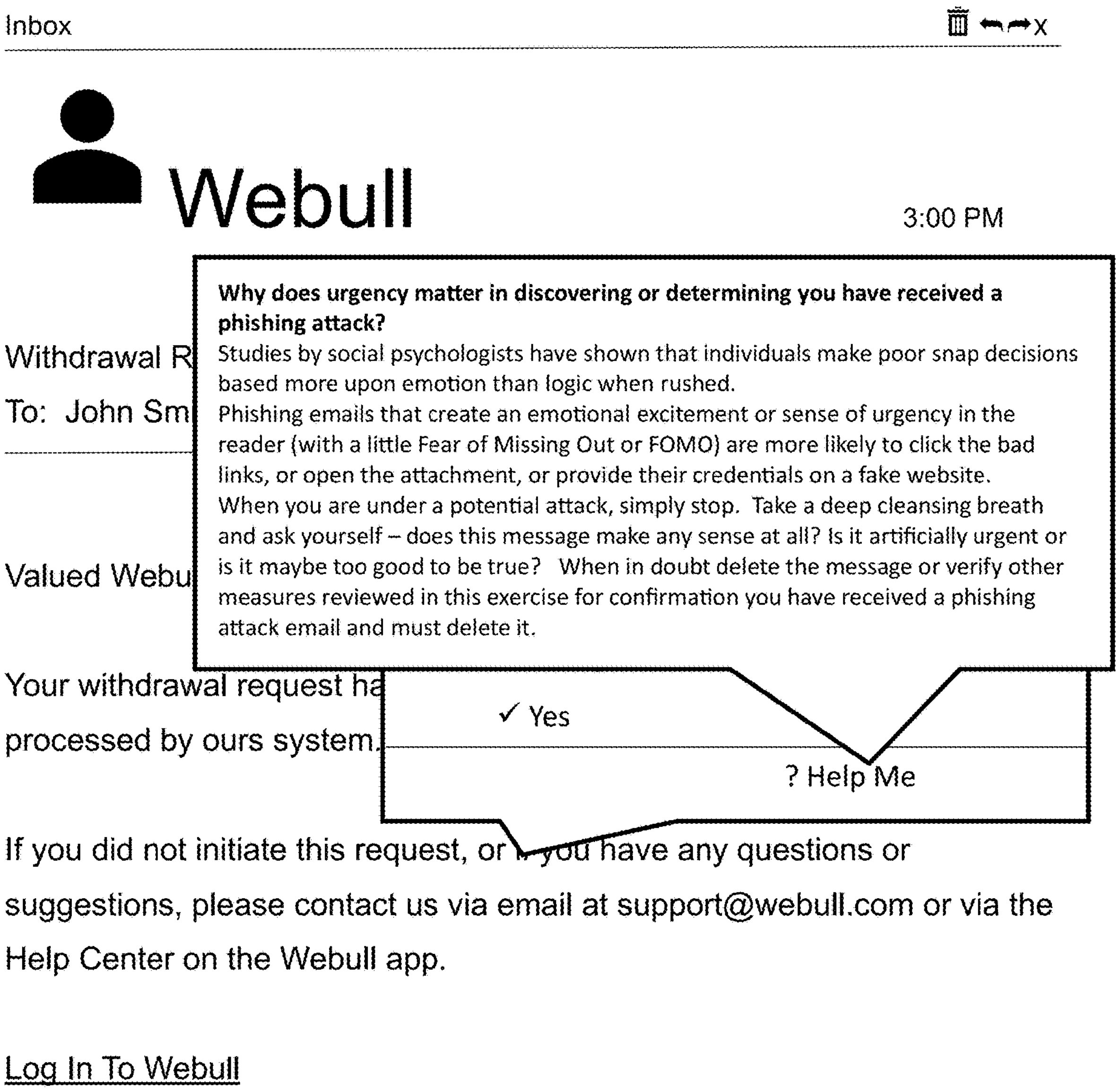
FIG. 10 illustrates an example of a help window that may be displayed to help the user understand how to evaluate the safety of the identifier of FIG. 9.

The assignment next moves on to the next indicator in the e-mail, for example, the urgency or emotional charge of the message text, and presents another popup window with "Yes" and "No" buttons and another "Help Me" link asking the user to indicate if the urgency or emotional charge of the e-mail text appears safe, e.g., consistent with a safe e-mail or one that is likely a phishing e-mail or other form of social engineering-containing e-mail. (See FIG. 9.) Like for the previously described indicators, if one hovers over or otherwise selects the displayed "Help Me" link, a popup window may appear that informs the user how they might be able to tell if the urgency or emotional charge of the message text appears safe or unsafe. The user may then select the "Yes" or "No" button in the popup associated with the urgency or emotional charge of the message text based on whether they think the urgency or emotional charge of the message text seems consistent with a safe e-mail or a social engineering-containing or phishing e-mail. (See FIG. 10.) In the example of FIGS. 9 and 10, the e-mail message text does not appear especially emotionally charged and does not seem to convey a sense of urgency so this may be consistent with an indicator of a safe e-mail.

Figure 11:
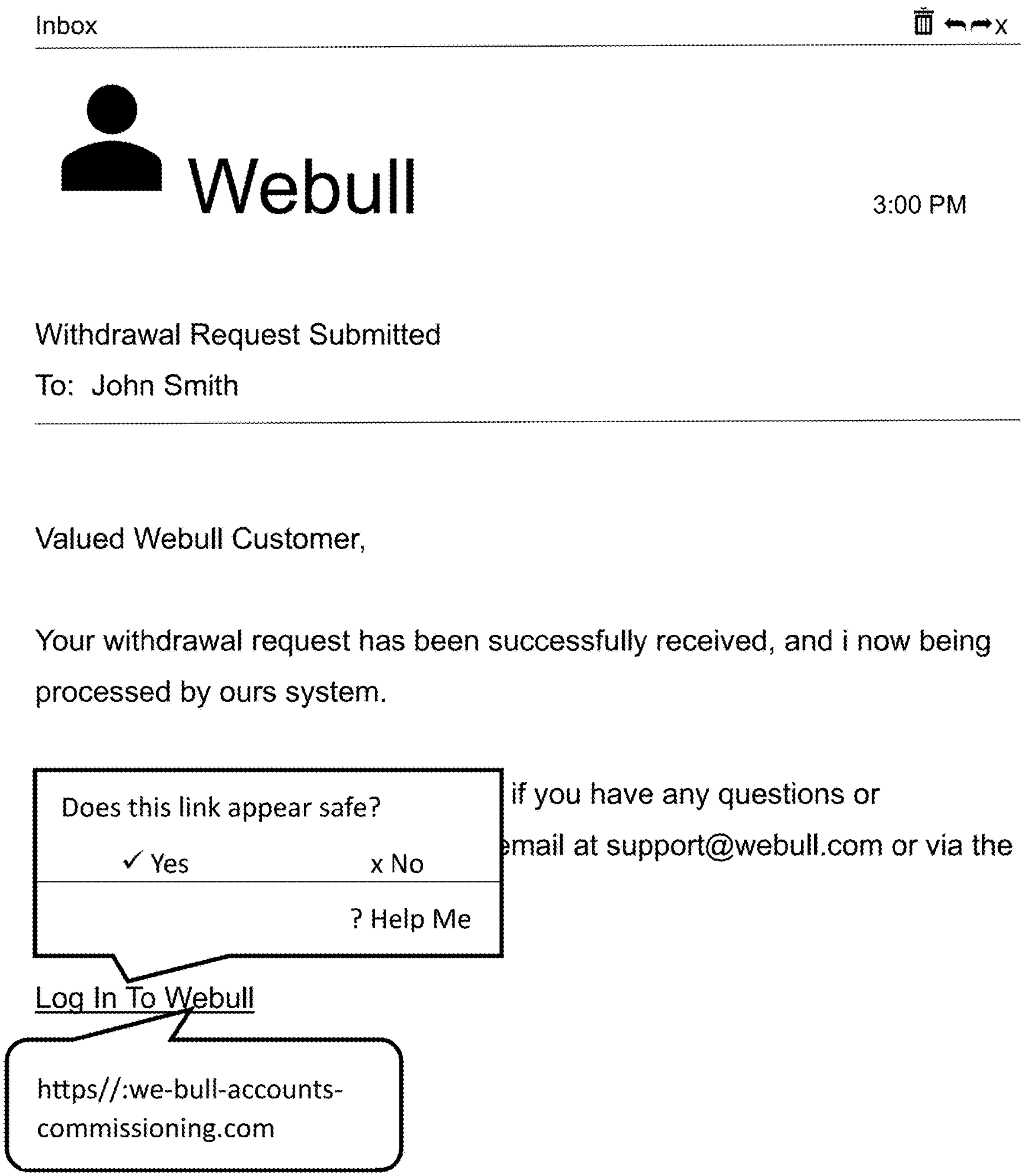
FIG. 11 illustrates an example of a displayed portion of a test asking a user to evaluate if another identifier in a simulated e-mail appears indicative of a safe or potentially malware-infected e-mail.

The assignment next moves on to the next indicator in the e-mail, for example, a web link included with the message text, and presents another popup window with "Yes" and "No" buttons and another "Help Me" link and asking the user to indicate if the web link appears safe, e.g., consistent with a safe e-mail or one that is likely a phishing e-mail or other form of social engineering-containing e-mail. (See FIG. 11.) Like for the previously described indicators, if one hovers over or otherwise selects the displayed "Help Me" link, a popup window may appear that informs the user how they might be able to tell if the web link should be considered safe or unsafe. The user may then select the "Yes" or "No" button in the popup associated with the web link based on whether they think web link seems consistent with a safe e-mail or a type of web link that may be included in a malware-containing or social engineering-containing phishing e-mail. In the example of FIG. 11, the web link appears to point to a suspicious web domain so this may be consistent with an indicator of an unsafe e-mail.

Figure 12:
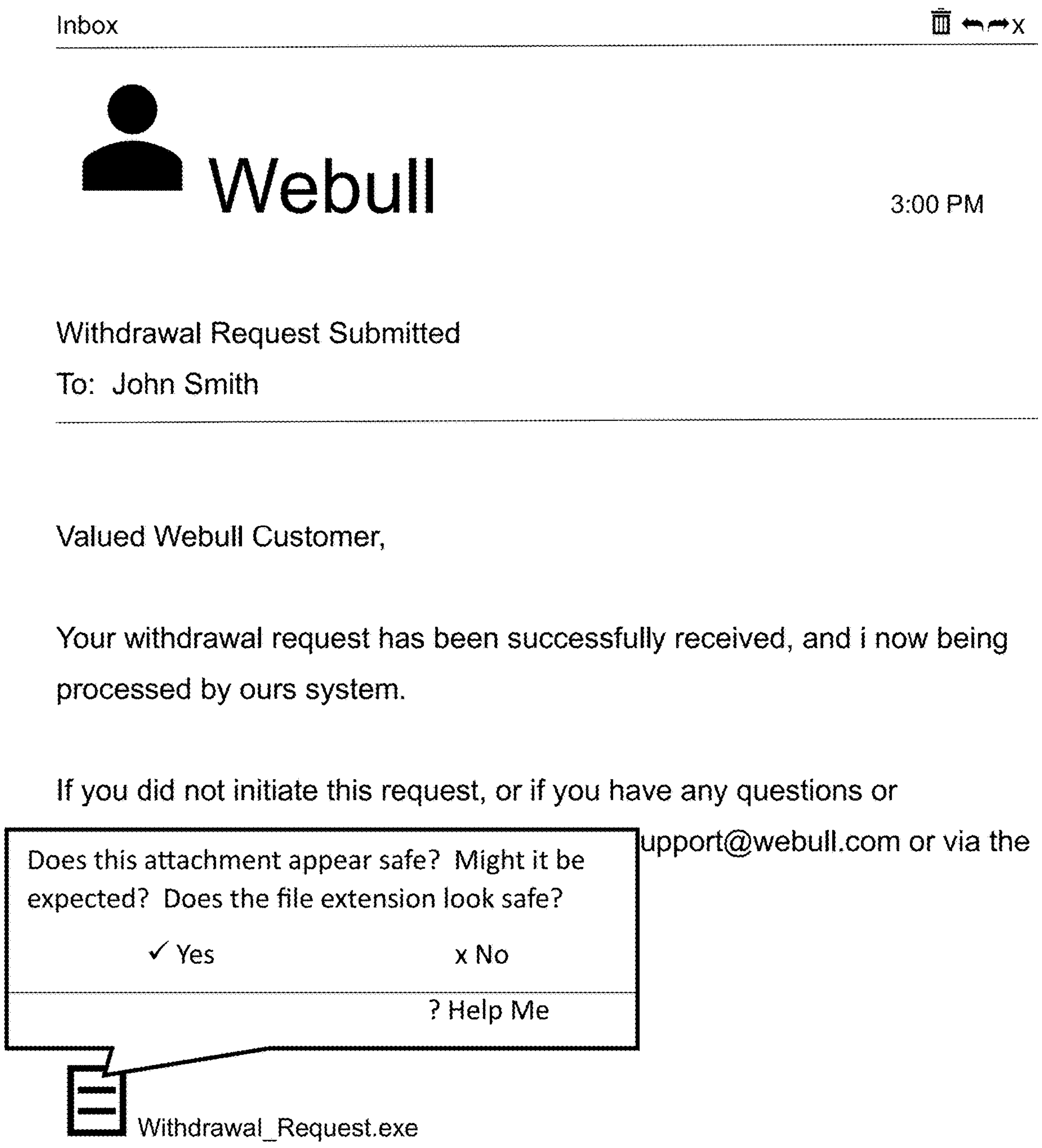
FIG. 12 illustrates an example of a displayed portion of a test asking a user to evaluate if another identifier in a simulated e-mail appears indicative of a safe or potentially malware-infected e-mail.
Figure 13:
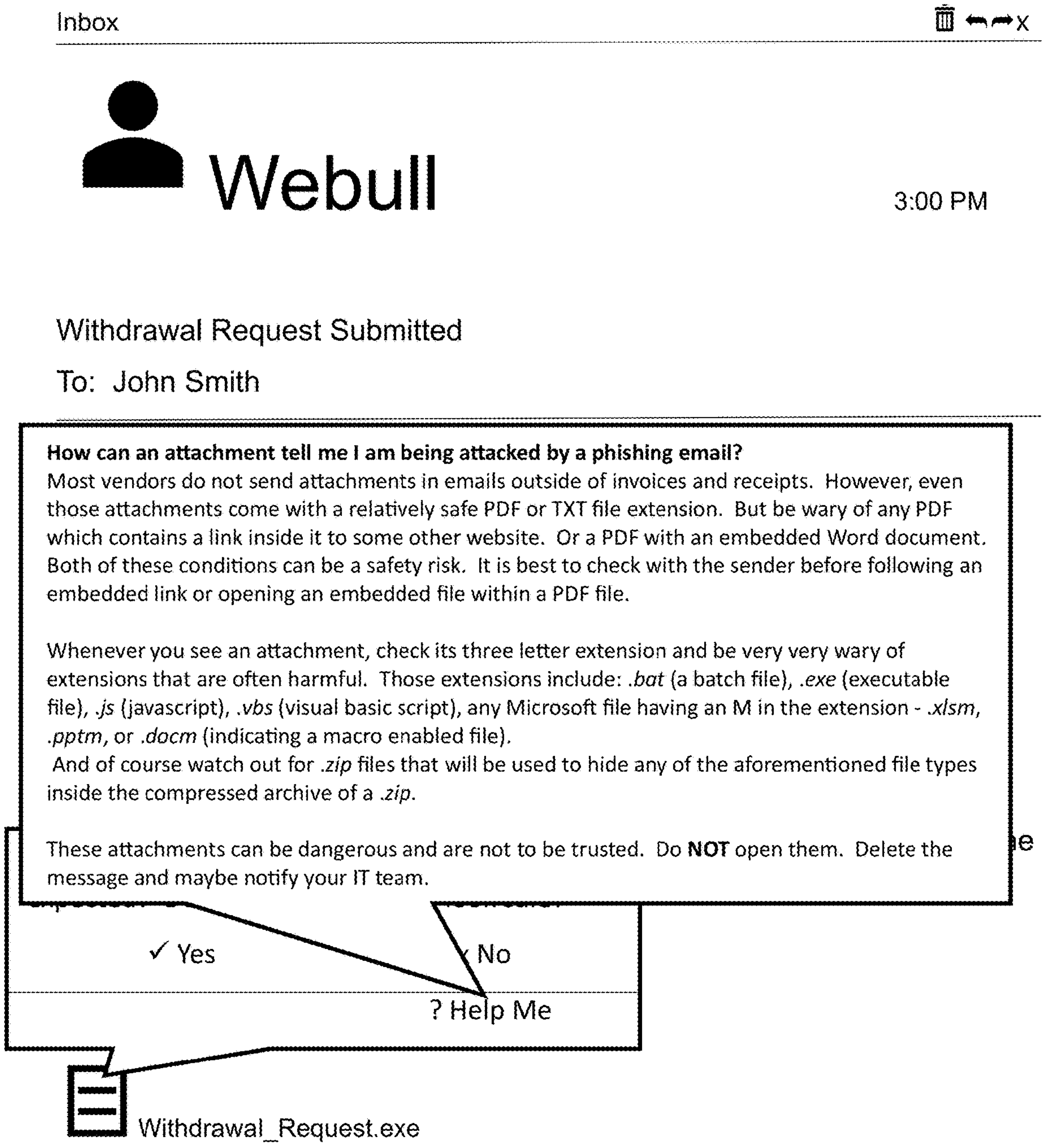
FIG. 13 illustrates an example of a help window that may be displayed to help the user understand how to evaluate the safety of the identifier of FIG. 12.
Figure 14:
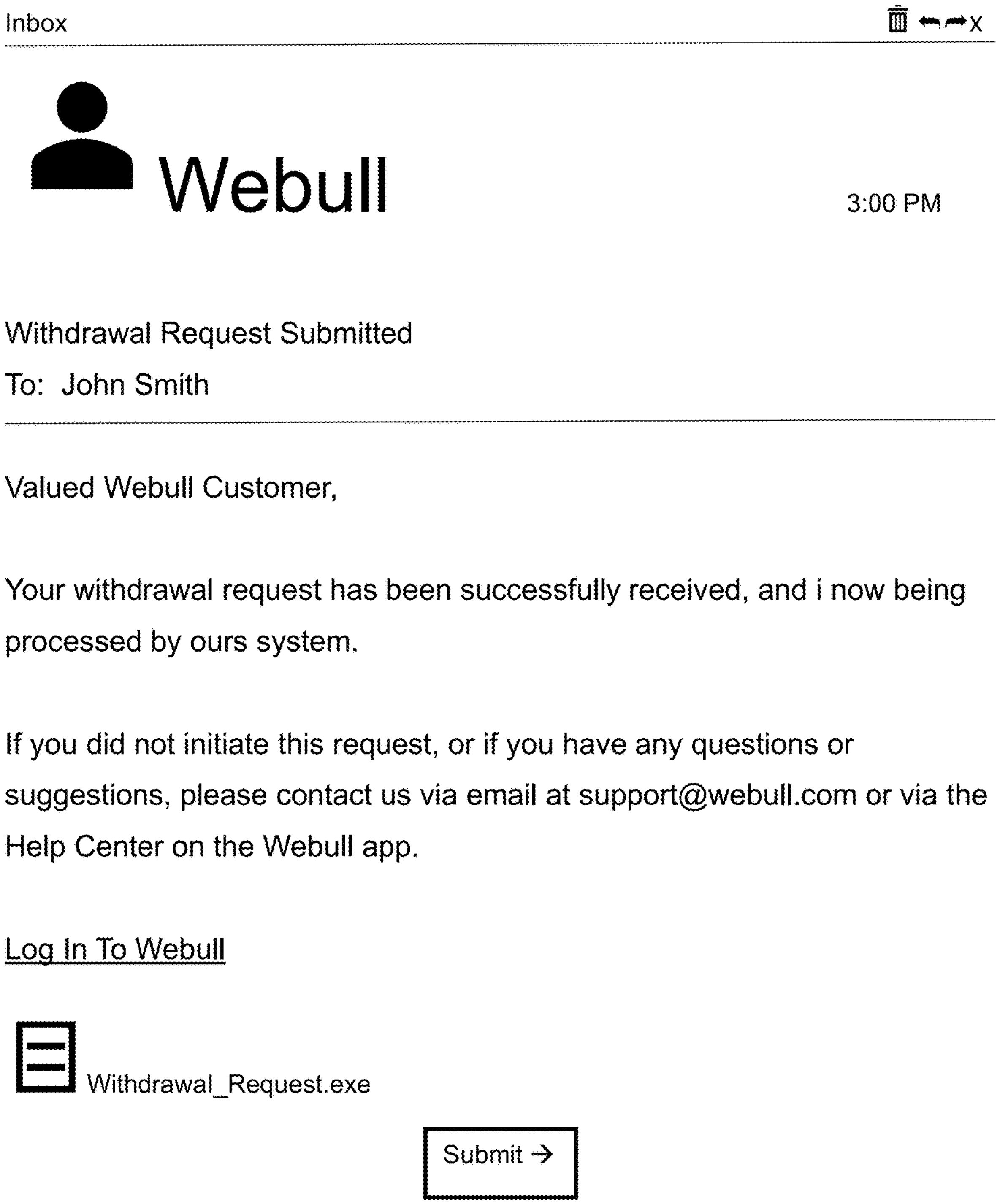
FIG. 14 illustrates a "Submit" button that one may select after making their selections as to whether they believe the identifiers in the simulated e-mail are safe or unsafe to have their answers scored.

The assignment next moves on to the next indicator in the e-mail, for example, an attachment to the e-mail, and presents another popup window with "Yes" and "No" buttons and another "Help Me" link and asking the user if the attachment appears safe, e.g., consistent with a safe e-mail or one that is likely a phishing e-mail or other form of social engineering-containing e-mail. (See FIG. 12.) Like for the previously described indicators, if one hovers over or otherwise selects the displayed "Help Me" link, a popup window may appear that informs the user how they might be able to tell if the attachment should be considered safe or unsafe. (See FIG. 13.) The user may then select the "Yes" or "No" button in the popup associated with the web link based on whether they think attachment seems consistent with a safe e-mail or is a type of attachment that may be included in a social engineering-containing or phishing e-mail. In the example of FIGS. 12 and 13, the attachment is an executable file so this may be consistent with an indicator of an unsafe e-mail.

After the user has answered the questions about each of the indicators, they may select a "Submit" button (See FIG. 14) and the system substantially immediately presents the user with a results screen showing which of the indicators they correctly or incorrectly identified as likely associated with a safe e-mail or with a phishing e-mail along with an indication of the user's score on the test, the required score for "passing" the test, and whether they "passed." (See FIG. 15.) Providing a user with their results screen and specifics regarding which indicators they correctly or incorrectly identified as likely associated with a safe e-mail or with a phishing e-mail substantially immediately differs from conventional attack-based learning which suffers from a long pause between failure, learning of that failure, and assignment of imperfect remediation lessons (videos) that do not truly educate effectively. Conventional attack-based phishing e-mail testing is a negative reinforcement (punishment-based) training method. If you fail, you are punished with more videos several days or weeks later that may not teach you what you need to learn. Studies have consistently shown that a positive reinforcement immediately following the stimulus inputs, consistently provides better learning. Contrasted with attack-based phish testing, the assignment-based phish testing methodologies disclosed herein leverage proven learning methods (positive reinforcement) that improve performance by providing immediate or substantially immediate feedback on outcomes from specific choices made in the assignment-based exercises combined with a positive outcome (passing the test). Contrasted with attack-based phish testing, the assignment-based phish testing methodologies disclosed herein shorten the input/outcome while providing educational opportunities to close knowledge gaps along the way and immediately. Passing the test may result in a display of a congratulations message to a user that is a positive reinforcement for learning the skills to continue passing the test in one's own inbox.

The platform, disclosed herein, eliminates the buildup of negative emotions and resentment that ensues when IT departments trick end users into mistakes and subsequently punish them with more costly (time consuming) endeavors of having to watch additional phishing training videos, and exercises that may not yield the necessary results (knowledge to avoid similar mistakes in the future). Instead, the platform builds trust, positive relationships, and gratitude between users of the system and their IT providers through the avoidance of negative reinforcement activities, while providing a positive educational activity for end users.

The platform, disclosed herein, has been 100% automated for the delivery of assignment-based phishing simulations relieving the IT Administrator of manual configuration of IT filtration systems (commonly called spam filtering) to allow phishing training assignments through to user's inboxes. Aspects and embodiments of the platform disclosed herein may be 100% automated in the sense that the platform may randomly determine content to include with the indicators of potential malware in simulated e-mails, consistent with the difficulty level assigned to a user, and may send messages to users asking them to participate in a phishing e-mail test assignment at predetermined or random intervals without intervention by an IT administrator.

Aspects and embodiments of the platform disclosed herein also removes the hurdle of IT administrators having to customize and tailor phishing attacks to the IT infrastructure, systems, and applications in use at a company to ensure they are believable and authentic-seeming to the end user.

Aspects and embodiments of the platform disclosed herein approach this exercise not to test the mettle and knowledge of what users "already know" but instead to teach them what they "should know" but do not. This helps create a consistent baseline knowledge of how to spot and avoid indicators of a phishing attack that may be present within an e-mail.

Figure 16:
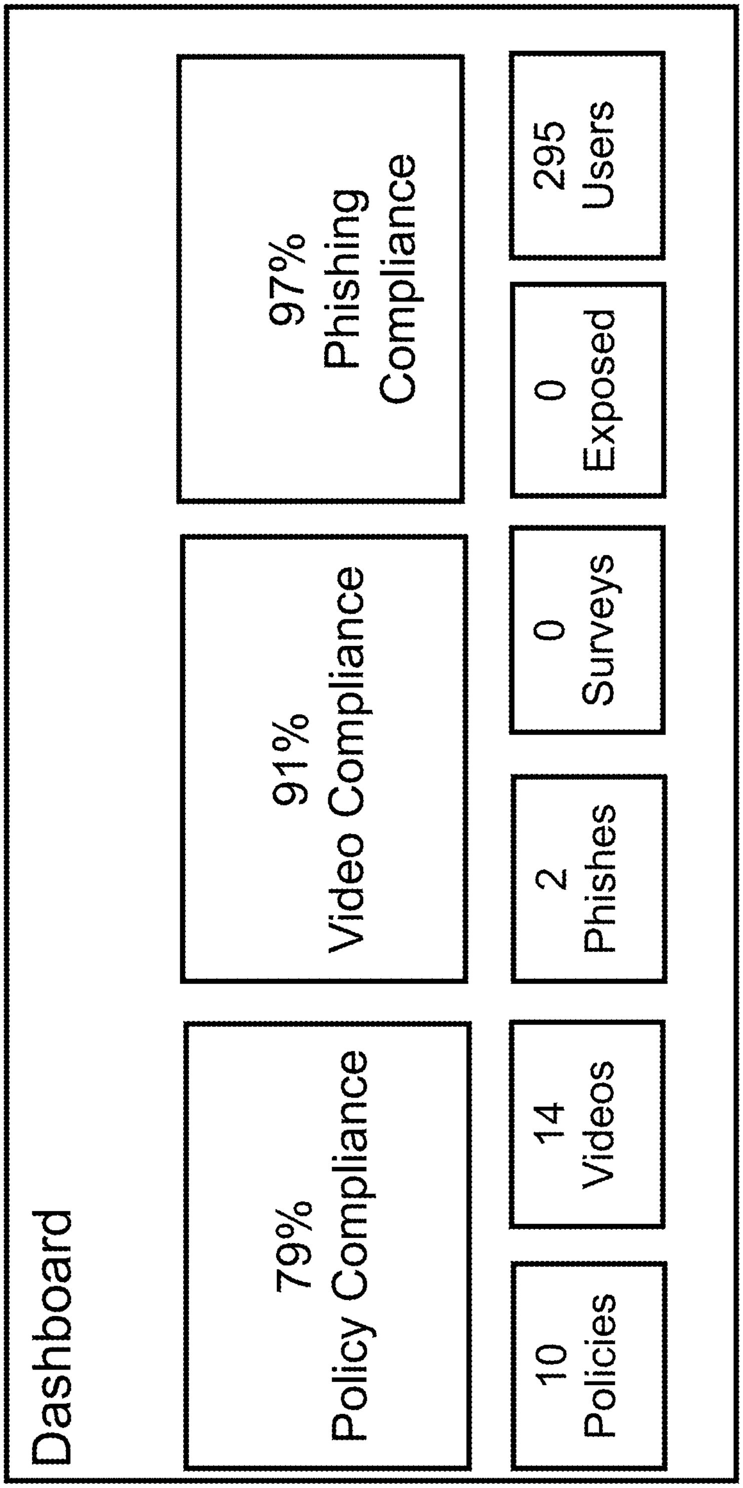
FIG. 16 is an example of a dashboard display that an administrator may view to determine the compliance rates of individuals in an organization with respect to tasks to be completed as part of the educational program.

An administrator of the system may access various dashboards to view metrics associated with the performance and compliance with the phish testing of users in an organization. As shown in FIG. 16, one dashboard may provide indications of metrics such as the percent of users who have completed their phishing assignments (97% of users have completed two phishing tests in the example of FIG. 16) as well as the percent of users who have completed other malware detection educational tasks such as the review of policies ("Policy Compliance) or training videos ("Video Compliance"). Another dashboard available to administrators may be a table listing individual users and their respective cumulative scores and ranks. (See FIG. 17.) In some embodiments, the ranks may be represented by different avatars as illustrated.

Various aspects and functions described herein in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

Figure 18:
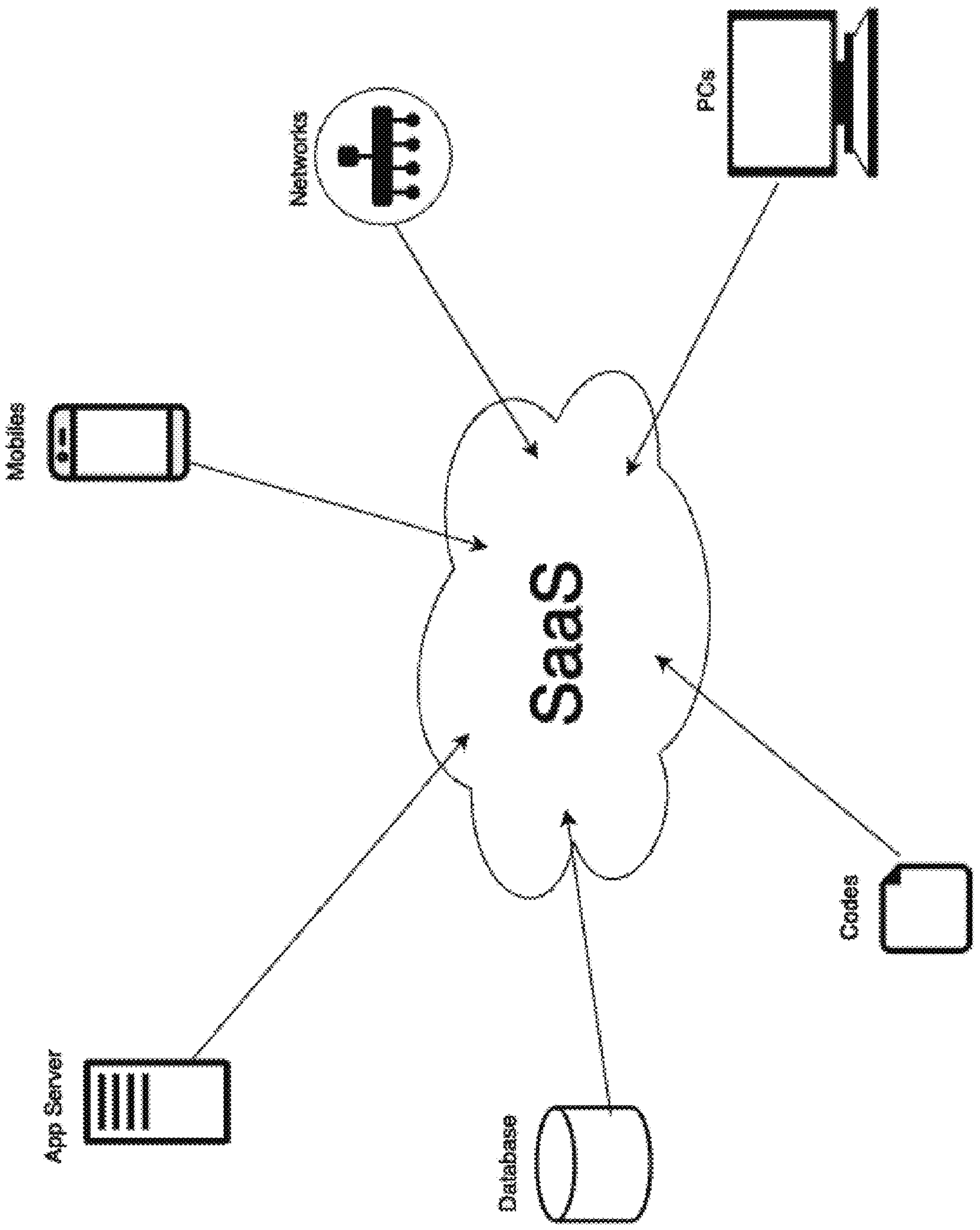
FIG. 18 illustrates a computing platform upon which various aspects in accord with the present invention may be implemented.

Aspects and embodiments of the platform disclosed herein may be implemented as a Software-as-a-Service (SaaS) platform leveraging the power of Amazon's Web Services architecture. An illustration of an example of such a platform is illustrated in FIG. 18. The Client is a Web Browser communicating securely over HTTPS (Hyper-Text Transfer Protocol Secure). It encrypts all data between Client and Server in the SaaS cloud at AWS. While the data is not highly sensitive, it is protected at rest and in motion with AES 256-bit encryption which is certified by the government at sufficient today. Administration of the application is protected using multi-factor authentication of Super Admins (the MSPs using the platform) and the Administrators (who admin their own tenant inside the SaaS platform). The SaaS platform runs on Docker virtual machines that are regularly updated in the AWS space to ensure they are secured. Monitoring is in place in multiple ways for service delivery, uptime, downtime, and other performance measures as may be necessary to protect the overall operation of the SaaS application.

Figure 19:
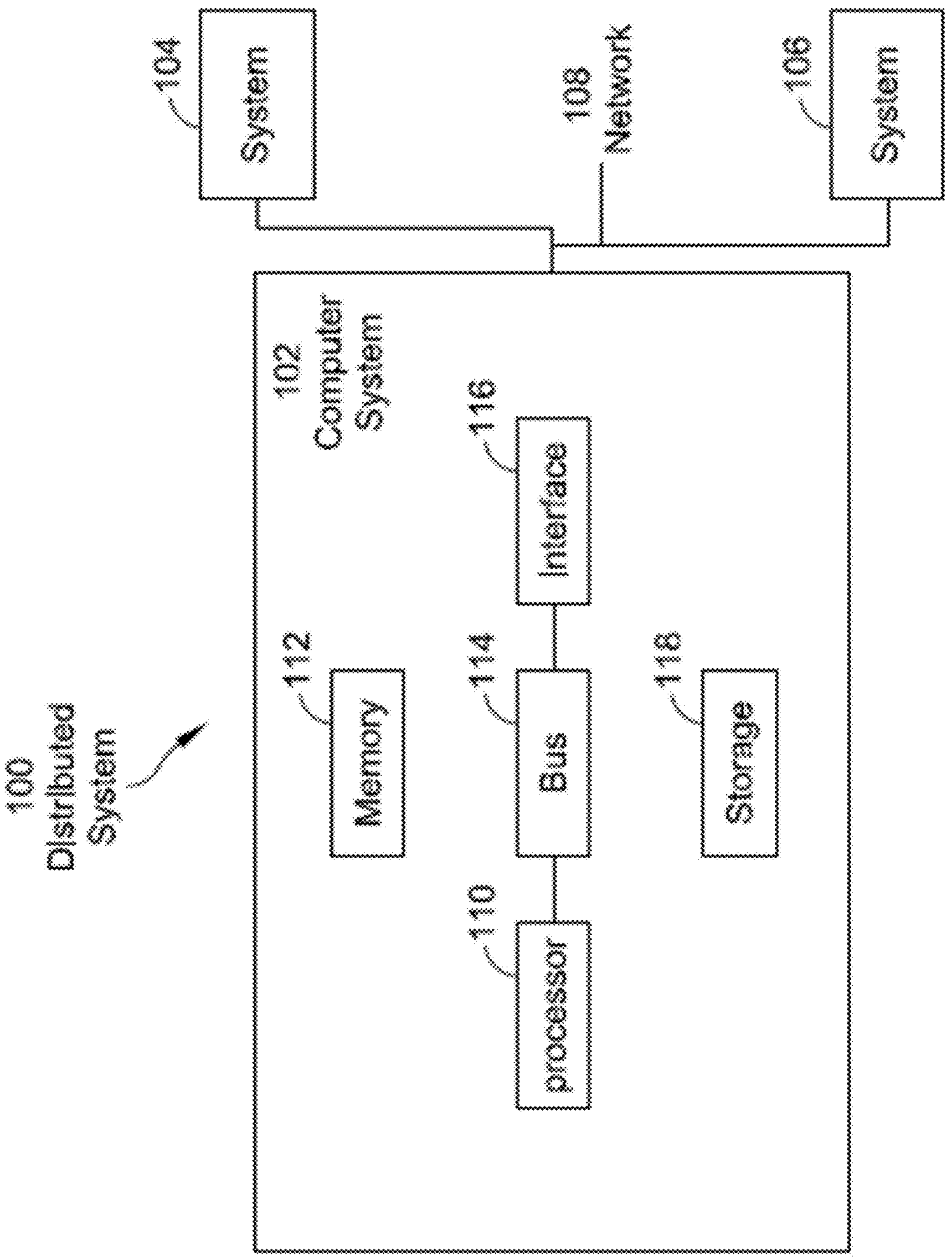
FIG. 19 is a block diagram of one example of a computer system with which various aspects in accord with the present invention may be implemented.

FIG. 19 shows a block diagram of a distributed computer system 100, in which various aspects and functions in accord with the present embodiments may be practiced. Distributed computer system 100 may include one more computer systems. For example, as illustrated, distributed computer system 100 includes computer systems 102, 104, and 106. One of computer systems 102, 104, 106 may be a server hosting a website that may be accessed by others of the computer systems 102, 104, 106 by users to complete assignments as disclosed herein. As shown, computer systems 102, 104, and 106 are interconnected by, and may exchange data through, communication network 108. Network 108 may include any communication network through which computer systems may exchange data. To exchange data using network 108, computer systems 102, 104, and 106 and network 108 may use various methods, protocols and standards, including, among others, Ethernet, TCP/IP, SMS, and Json. To ensure data transfer is secure, computer systems 102, 104, and 106 may transmit data via network 108 using a variety of security measures including TLS, SSL, or VPN among other security techniques. While distributed computer system 100 illustrates three networked computer systems, distributed computer system 100 may include any number of computer systems and computing devices, networked using any medium and communication protocol.

Various aspects and functions in accordance with the present embodiments may be implemented as specialized hardware or software executing in one or more computer systems including computer system 102 shown in FIG. 19. As depicted, computer system 102 includes processor 110, memory 112, bus 114, interface 116, and storage 118. Processor 110 may perform a series of instructions that result in manipulated data. Processor 110 may be a commercially available processor such as an Intel Core®, Motorola PowerPC, SGI MIPS, Sun UltraSPARC, or Hewlett-Packard PA-RISC processor, but may be any type of processor, multi-processor, microprocessor, or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random-access memory such as a dynamic random-access memory (DRAM) or static memory (SRAM). However, memory 112 may include any device for storing data, such as a disk drive or other non-volatile, non-transitory, storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI, and InfiniBand. Thus, bus 114 enables communications, for example, data and instructions, to be exchanged between system components of computer system 102.

Computer system 102 also includes one or more interface devices 116 such as input devices, output devices, and combination input/output devices. Interface devices may receive input or provide output. More particularly, output devices may render information for external presentation. The interface devices 116 may include, for example, one or more graphical user interfaces that may be disposed proximate to or separate from other components of the computer system 102. A graphical user interface of the computer system 102 may, for example, be displayed through a web browser that accesses information from the memory 112. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable, nonvolatile, non-transitory, storage medium in which instructions are stored that define a program to be executed by the processor. The program to be executed by the processor may cause the processor 100 or computer system 102 to perform any one or more embodiments of the methods disclosed herein. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk, or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then may copy the data to the medium associated with storage system 118 after processing is completed. A variety of components may manage data movement between the medium and integrated circuit memory element and the presently described embodiments are not limited thereto. Further, the embodiments are not limited to a particular memory system or data storage system. Portions of the memory 112 or storage system 118 may be included in the same computer system as other components of the computer system 102 or may be resident in a cloud-based system that is accessible via the internet or other communications system or protocol.

Although computer system 102 is shown by way of example as one type of computer system upon which various aspects and functions in accordance with the present embodiments may be practiced, any aspects of the presently disclosed embodiments are not limited to being implemented on the computer system as shown in FIG. 19. Various aspects and functions in accordance with the presently disclosed embodiments may be practiced on one or more computers having a different architectures or components than that shown in FIG. 19. For instance, computer system 102 may include specially-programmed, special-purpose hardware, for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system such as Windows 11 or Windows 10 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML, or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A computerized platform for implementing an educational phishing awareness campaign, the computerized platform configured to:

present a user with one or more simulation assignments within a browser-based instructional interface independent of the user's email inbox;

disclose to the user prior to commencement that each of the one or more simulation assignments is a non-deceptive instructional exercise;

prompt the user to independently evaluate and indicate as safe or suspicious, discrete phishing indicators within a simulated e-mail in the browser-based instructional interface using a cumulative assessment methodology; and deliver real-time instructional feedback on each indicator during the one or more simulation assignments.

2. The platform of claim 1, further configured to send an e-mail to a user inviting them to participate in an assignment of the one or more simulation assignments, and responsive to the user accepting the invitation, presenting the assignment to the user in a the browser-based instructional interface.

3. The platform of claim 1, further configured to sequentially present the user with a popup window for each discrete indicator in the simulated email, the popup window comprising selectable safe or unsafe response options the user must individually evaluate and submit before proceeding to a next indicator.

4. The platform of claim 3, further configured to present to user with a selectable help link which, if selected by the user, presents the user with information regarding how to determine whether the indicator within the simulated e-mail should be considered safe or unsafe.

5. The platform of claim 1, wherein the simulated email presented to the user includes one or more indicators comprising typo-squatted domain names that reflect realistic phishing attack patterns, thereby providing the user with practice identifying a type of domain manipulation commonly used in actual social engineering attacks.

6. The platform of claim 1, further configured to present a user with a score and an indication of whether they have passed the one or more simulation assignments substantially immediately responsive to the user having individually evaluated and submitted a safe or unsafe determination for each of the one or more indicators.

7. The platform of claim 6, further configured to request the user to re-take the one or more simulation assignments if they did not receive a passing score.

8. The platform of claim 7, further configured to randomly select from different content to include within each of the one or more indicators if the user re-takes the one or more simulation assignments.

9. The platform of claim 6, further configured to present the user with a results screen identifying, for each discrete indicator in the simulated email, whether the user's safe or unsafe determination was correct or incorrect.

10. The platform of claim 1, further configured to present the use with positive reinforcement responsive to passing the one or more simulation assignments.

11. The platform of claim 1, further configured to randomly assign content that should be considered either safe or unsafe to each of the one or more indicators.

12. The platform of claim 1, further configured to compute an overall score for the user based on cumulative accuracy of the user's evaluation across each individual indicator in one or more completed ones of the one or more simulation assignments, and to assign a rank to the user based on the overall score.

13. The platform of claim 12, further configured to present the rank of the user as a visual avatar, wherein different avatars correspond to different rank levels and change as the rank of the user changes.

14. The platform of claim 1, wherein the one or more indicators include a plurality of indicators selected from the group including sender, subject, greeting, spelling, punctuation, and grammar, urgency and emotionality, links to external websites, and attachments.

15. The platform of claim 1, further configured to automatically adjust difficulty of subsequent simulation assignments taken by the user based on performance of the user in prior simulation assignments.

16. The platform of claim 15, further configured to implement at least three difficulty levels, wherein each difficulty level specifies a different ratio of unsafe-to-safe indicators within the simulated email presented to the user, and wherein the user is automatically advanced to a higher difficulty level based on accumulated performance points.

17. The platform of claim 15, further configured to permit a system administrator to manually reset a user's assigned difficulty level.

18. The platform of claim 1, further configured to automatically deliver prompts for performance of assignment-based phishing simulations to e-mail inboxes of users without a need for an administrator to perform email filtration bypass functions including any one or more of: i) direct injection ii) allow-listing, iii) X-Header usage, or iv) PowerShell scripting to deliver the prompts to the inboxes of the users.

19. The platform of claim 1, further configured to provide an indication to an administrator of which users in an organization have completed one of the one or more simulation assignments or not.

* * * * *